United States Patent
Sofia

(10) Patent No.: US 11,628,598 B2
(45) Date of Patent: Apr. 18, 2023

(54) SYSTEMS AND METHOD FOR MANUFACTURING PELLETS FROM MIXED PLASTICS

(71) Applicant: Richard Sofia, Troy, OH (US)

(72) Inventor: Richard Sofia, Troy, OH (US)

(73) Assignee: Richard Sofia, Troy, OH (US)

( * ) Notice: Subject to any disclaimer, the term of this patent is extended or adjusted under 35 U.S.C. 154(b) by 179 days.

(21) Appl. No.: 17/141,663

(22) Filed: Jan. 5, 2021

(65) Prior Publication Data

US 2022/0212367 A1  Jul. 7, 2022

(51) Int. Cl.
| | |
|---|---|
| B29B 9/06 | (2006.01) |
| B29C 71/00 | (2006.01) |
| B29C 48/00 | (2019.01) |
| B29C 48/04 | (2019.01) |
| B29C 48/88 | (2019.01) |
| B29C 48/05 | (2019.01) |
| B29K 105/26 | (2006.01) |

(52) U.S. Cl.
CPC ............ *B29B 9/06* (2013.01); *B29C 48/0018* (2019.02); *B29C 48/0022* (2019.02); *B29C 48/04* (2019.02); *B29C 48/05* (2019.02); *B29C 48/911* (2019.02); *B29C 48/919* (2019.02); *B29C 71/0009* (2013.01); *B29C 2793/009* (2013.01); *B29K 2105/26* (2013.01)

(58) Field of Classification Search
CPC ........ B29C 48/05; B29C 71/0009; B29B 9/06
USPC ........................................................ 264/920
See application file for complete search history.

(56) References Cited

U.S. PATENT DOCUMENTS

| | | | |
|---|---|---|---|
| 3,549,732 A | 12/1970 | Rice | |
| 3,922,255 A | 11/1975 | Koestler et al. | |
| 5,464,335 A * | 11/1995 | Bessemer | B29C 48/9115 425/86 |
| 5,759,680 A | 6/1998 | Brooks et al. | |
| 6,361,734 B1 * | 3/2002 | Miki | B29C 48/04 264/37.32 |
| 6,730,250 B2 * | 5/2004 | Saitou | B29B 9/16 241/3 |
| 6,783,715 B2 * | 8/2004 | Okamura | B29B 17/04 264/921 |
| 6,958,127 B1 | 10/2005 | Suzuki et al. | |
| 8,388,873 B2 | 3/2013 | Hofmann et al. | |
| 9,545,650 B2 | 1/2017 | Wang et al. | |
| 9,869,042 B2 | 1/2018 | Chou et al. | |
| 9,931,773 B2 | 4/2018 | Fitzpatrick | |
| 10,526,557 B2 | 1/2020 | White | |
| 2002/0055006 A1 | 5/2002 | Vogel et al. | |
| 2004/0131853 A1 | 7/2004 | Mushiake et al. | |
| 2008/0093763 A1 | 4/2008 | Mancosh et al. | |
| 2009/0047499 A1 | 2/2009 | Tilton | |
| 2009/0155568 A1 | 6/2009 | Erwin | |
| 2011/0185631 A1 | 8/2011 | Subramanian et al. | |
| 2013/0237644 A1 | 9/2013 | Xin et al. | |
| 2014/0220280 A1 * | 8/2014 | Sethu | B29C 48/395 521/46.5 |
| 2016/0193771 A1 | 7/2016 | Deiss et al. | |
| 2021/0114259 A1 * | 4/2021 | Fukuzawa | B29B 7/72 |

FOREIGN PATENT DOCUMENTS

| | | |
|---|---|---|
| JP | 2001096530 A | 4/2001 |
| JP | 2003200422 A | 7/2003 |
| KR | 20100038885 A | 4/2010 |
| WO | 0238576 A1 | 5/2002 |

OTHER PUBLICATIONS

International Search Report and Written Opinion dated Apr. 27, 2022 for International Application No. PCT/US2022/011129.

* cited by examiner

*Primary Examiner* — Atul P. Khare
(74) *Attorney, Agent, or Firm* — Seager, Tufte & Wickhem, LLP

(57) ABSTRACT

Systems and methods for forming pellets from mixed plastic materials are disclosed. An example method may include a method for forming pellets from mixed plastic materials without needing to screen or filter the mixed plastic materials. The method may include disposing a mixed plastic material into an extrusion apparatus, advancing the mixed plastic material through a die to form strands, and cutting the strands into a plurality of pellets.

20 Claims, 1 Drawing Sheet

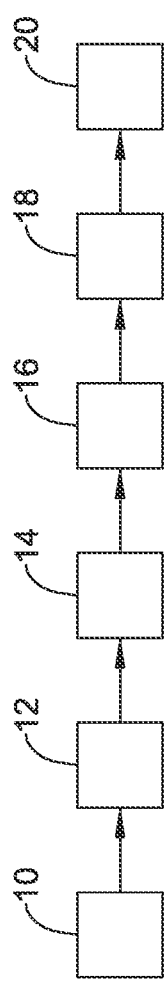

US 11,628,598 B2

SYSTEMS AND METHOD FOR MANUFACTURING PELLETS FROM MIXED PLASTICS

TECHNICAL FIELD

The present disclosure pertains to systems and methods for manufacturing pellets from mixed plastics.

BACKGROUND

A wide variety of systems and methods are known for making plastic materials and/or materials from plastics. Of the known systems (e.g., compounding and pelletizing systems) and methods, each has certain advantages and disadvantages. There is an ongoing need to provide alternative systems and methods for making plastic materials and/or materials from plastics.

BRIEF SUMMARY

This disclosure provides systems and methods for manufacturing pellets from mixed plastics. A method for forming pellets from mixed plastic materials without needing to screen or filter the mixed plastic materials is disclosed. The method comprises: disposing a mixed plastic material into an extrusion apparatus; advancing the mixed plastic material through a die to form strands; and cutting the strands into a plurality of pellets.

Alternatively or additionally to any of the embodiments above, the mixed plastic material comprises previously used plastic material.

Alternatively or additionally to any of the embodiments above, the mixed plastic material comprises two or more different plastics.

Alternatively or additionally to any of the embodiments above, the mixed plastic material comprises three or more different plastics.

Alternatively or additionally to any of the embodiments above, the mixed plastic material comprises materials such as paper.

Alternatively or additionally to any of the embodiments above, further comprising heating the mixed plastic material.

Alternatively or additionally to any of the embodiments above, advancing the mixed plastic material through a die to form strands includes advancing the mixed plastic material through an enlarged-hole strand die.

Alternatively or additionally to any of the embodiments above, further comprising stretching the strands.

Alternatively or additionally to any of the embodiments above, further comprising forming a skin material on the strands.

Alternatively or additionally to any of the embodiments above, further comprising cooling the strands.

Alternatively or additionally to any of the embodiments above, prior to cooling the strands, further comprising stretching the strands, forming a skin on the strands, or both.

A method for forming pellets from recycled plastic is disclosed. The method comprises: disposing a mixed plastic material into an extrusion apparatus; wherein the extrusion apparatus is free of a screen; wherein the extrusion apparatus is free of a melt filter; heating the mixed plastic material; advancing the mixed plastic material through a die to form a plurality of mixed plastic strands; and cutting each of the mixed plastic strands into a plurality of mixed plastic pellets.

Alternatively or additionally to any of the embodiments above, the mixed plastic material comprises two or more different plastics.

Alternatively or additionally to any of the embodiments above, the mixed plastic material comprises three or more different plastics.

Alternatively or additionally to any of the embodiments above, advancing the mixed plastic material through a die to form strands includes advancing the mixed plastic material through an enlarged-hole strand die.

Alternatively or additionally to any of the embodiments above, further comprising stretching the mixed plastic strands.

Alternatively or additionally to any of the embodiments above, further comprising forming a skin material on the mixed plastic strands.

Alternatively or additionally to any of the embodiments above, further comprising cooling the mixed plastic strands.

Alternatively or additionally to any of the embodiments above, prior to cooling the mixed plastic strands, further comprising stretching the mixed plastic strands, forming a skin on the mixed plastic strands, or both.

A method for forming pellets from recycled plastic is disclosed. The method comprises: disposing a mixed plastic material into an extrusion apparatus; wherein the extrusion apparatus is free of a screen; wherein the extrusion apparatus is free of a melt filter; heating the mixed plastic material; advancing the mixed plastic material through a strand die to form a plurality of mixed plastic strands, the strand die having a plurality of non-restrictive openings formed therein that are configured to allow the mixed plastic material to pass therethrough; forming a skin on the mixed plastic strands; stretching the mixed plastic strands; and cutting each of the mixed plastic strands into a plurality of mixed plastic pellets.

Alternatively or additionally to any of the embodiments above, further comprising cooling the mixed plastic strands prior to forming a skin on the mixed plastic strands, prior to stretching the mixed plastic strands, or prior to both forming a skin on the mixed plastic strands and stretching the mixed plastic strands.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which:

FIG. 1 is a flowchart depicting an example process for manufacturing pellets from mixed plastic material.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the invention.

Articles made from plastics are ubiquitous in our world. In some instances, manufacturing such articles may include a molding or casting processes that uses plastic resins or pellets that are placed into a mold. The plastic pellets can be so-called "virgin" materials, which are plastics that are newly formed and not previously used. In other instances, previously used plastic materials may be recycled.

Articles formed from plastic materials typically bear a plastic identification code, typically numbered from 1 to 7, that helps to identify the type of plastic in the article. For example, plastic articles with a plastic identification code of 1 may include polyethylene terephthalate (PET), plastic materials with a plastic identification code of 2 may include high-density polyethylene (HDPE), plastic materials with a plastic identification code of 3 may include polyvinylchloride (PVC), plastic materials with a plastic identification code of 4 may include low-density polyethylene (LDPE), plastic materials with a plastic identification code of 5 may include polypropylene (PP), plastic materials with a plastic identification code of 6 may include polystyrene (PS), and plastic materials with a plastic identification code of 7 may include other plastics such as polycarbonate or acrylonitrile butadiene styrene (ABS).

For a number of reasons, there may be a desire to utilize/recycle plastic materials when making new plastic articles. Manufacturers that work with previously used materials may receive a batch of plastics materials of one type/code or a batch of mixed plastic materials that are from more than type/code of plastics. The manufacturer may then process the materials into new plastic articles. It can be appreciated that the mixed plastic materials may have a widely variable material composition, may have a significant amount of unwanted or waste material, and/or may include mixes of plastics that may not all be aligned with the ultimate end-use goal. As such, manufactures working with mixed plastics use a screening or filtering process where a screen can be used to remove unwanted materials and/or plastics outside the scope of a given project. The screening processes typically employed when using mixed plastics may use screens or filters that do not allow certain materials and/or materials of a certain size to pass therethrough. For example, an extrusion apparatus filled with mixed plastics may be heated to a temperature sufficient to melt a target material within the mixed plastics. The molten material may then pass through a screen or filter whereas non-molten material (e.g., which may include plastics that are not melted and/or other materials including non-melt materials) may be prevented from passing through the filter. Newer technology and/or alternative screening processes may include the use of a melt filter, which automatically removes undesired materials. Regardless of the type of screen and/or screening process utilized, screening is conventional in the industry. Indeed, recycling mixed plastic materials have typically not been possible at all without such a screen and/or screening process.

Disclosed herein are systems and methods that can be used with mixed plastic materials, for example to form pellets from the mixed plastic materials. Unlike conventional systems and methods, the systems and methods disclosed herein allow for the processing of mixed plastics, for example into pellets, without the use of a screen, size-excluding screen, melt filter, another type of screen or screening process, and/or the like. The resultant pellets can then be used by plastic manufactures using convention equipment and/or processes (e.g., conventional molding equipment and/or processes).

FIG. 1 is a flowchart depicting an example process for manufacturing pellets from mixed plastics. Box 10 represents the mixed plastic material, for example in a hopper or chamber of an extrusion apparatus. In some instances, the mixed plastic material may include 2 or more dissimilar materials. In some of these and in other instances, the mixed plastic material may be previously used mixed plastic material sourced from industrial sources, consumer sources, etc. In some instances, the mixed plastic material may include 2 or more different types/codes of plastic material, 3 or more different types/codes of plastic material, 4 or more different types/codes of plastic material, 5 or more different types/codes of plastic material, 6 or more different types/codes of plastic material, 7 or more different types/codes of plastic material. The mixed plastic material may also include a number of additional materials such as paper, rubber, non-melt material, and/or the like.

In some instances, the mixed plastic material may be heated within the extrusion apparatus. This may include melting or partially melting one or more of the components within the mixed plastic material. The mixed plastic material may be advanced within the extrusion apparatus toward a die. In some instances, the die may be a strand die. Advancing the mixed plastic material within the extrusion apparatus may include the use of a screw or auger within the extrusion apparatus that helps to move the mixed plastic material. In some instances, the size and/or power of the screw can be configured for the desired extrusion rate. In some instances, relatively slow rates may be utilized. In other instances, relatively high rates may be utilized.

As indicated above, manufactures working with mixed plastic material use a screening process that aims to remove unwanted material(s) from the mixed plastic material (e.g., such as unwanted plastics, paper, rubber, non-melt material, etc.). The screening process, thus, reduces the amount of material the reaches and/or passes through the die. It can be appreciated that as material is removed, the efficiency of the process (e.g., the total mass of material passing through the die divided by the total mass of source material used in the extrusion apparatus) decreases. In some cases, 50% or more of the source material may be removed by the screening process, thereby lowering the process efficiency to 50% or less. In the process described herein, the extrusion apparatus does not include a screen or screening process such as a screen, size-excluding screen, melt filter, another type of screen or screening process, and/or the like. In other words, in the process described herein the extrusion apparatus is free of a screen, free of a size-excluding screen, free of a melt filter, and/or the like. Because of this, substantially all of the mixed plastic source material (e.g., including plastics and potentially also including paper, rubber, non-melt material, and/or the like) reaches and/or passes through the die. Accordingly, the efficiency of the processes disclosed herein are higher than traditional processes. For example, the processes disclosed herein may have an efficiency of about 60% or more, or about 70% or more, or about 80% or more, or about 90% or more, or about 95% or more, or about 96% or more, or about 97% or more, or about 98% or more, or about 99% or more, or nearly/substantially 100%.

The mixed plastic material may be extruded or otherwise pass through the die to form strands. Box 12 represents the extruded strands and/or the process of extruding the mixed plastic material into strands. In some instances, the die may be configured to allow a greater quantity of material to pass therethrough when compared to conventional strand dies used with mixed plastic material. For example, the openings in the die may be larger than conventional strand dies. Thus, the die may be described as an enlarged-hole die or an enlarged-hole strand die. One example conventional strand die may have hole sizes on the order of about 0.125 inches (⅛ inch). Enlarged-hole dies for use with the process disclosed herein may be about 1.25 to 4 times larger in size, or about 1.5 to 3 times larger in size, or about 2 times larger in size. An enlarged-hole die does allow for more material to flow through than conventional dies but more importantly allows the material to be stronger as it is thicker and will be less likely to break while passing through the die. This may be desirable for a number of reasons. For example, non-melt materials that may be present within the extruded strands could make the strands weaker (e.g., and/or more prone to break), which can cause a number of problems to a molder. By allowing more material to pass through the die and by forming thicker strands, the strength of the strands can be enhanced, thereby reducing the likelihood of strand breakage. Thus, in addition to not using a screening process (e.g., a screening process that reduces the amount of non-melt material passing toward/through the die), the process disclosed herein also allows for more material to pass through the die than convention processes. Collectively, unlike conventional processes that aim to exclude materials from passing through the extrusion apparatus (e.g., by using a screen and/or dies that may restrict the passage of certain materials therethrough and, thus, allow less material to flow through), the lack of a screen and larger die openings are designed to allow more materials to pass therethrough and form stronger and more robust. Surprisingly, this allows for mixed plastics to be manufactured that are thicker upon extrusion, more resistant to breaking, and that can be used for subsequent manufacturing using standard equipment and processes (e.g., molding equipment and/or processes).

In addition, the number of holes/openings formed in the die may be reduced relative to that of conventional dies. In some instances, the dies used for the processes disclosed herein may include about 10-30 openings, or about 15-25 openings, or about 17-21 openings. This may be 5-40% fewer openings than conventional strand dies, or about 5-30% fewer openings than conventional strand dies, or about 8-27% fewer openings than conventional strand dies. By reducing the number of die holes and increasing the size of the holes, more material may be pass through the die, allowing a stronger material to pass through that is resistant to strand breakage.

In some instances, a coating or skin may be applied to or formed on the extruded strands. Box 14 represents the skinned strands and/or the process of skinning the extruded strands. In some instances, the skin may be formed by blowing air onto the extruded strands. In some of these and in other instances, the skin may be formed by applying a liquid such as water or mineral oil (e.g., by misting) onto the extruded strands. The skin may comprise a portion of the mixed plastic that, upon passing through the die, begins to solidify along the exterior of the strand. Skinning forms a relatively hard/firm shell or skin around the outside of the strands. Because the skinned strands are still relatively hot upon passing through the die, water or oil contacting the skinned strand will be vaporized upon contacting the skin, rather than being absorbed by the strand. This may be particularly useful when the strands contain an amount of water absorbing material therein such as paper. Thus, the skin can help to reduce intake of moisture into the strands, which might otherwise make the strands more prone to breaking.

The strands may also be pulled/stretched. Box 16 represents the stretched strands and/or the process of stretching the strands. In general, stretching may occur by pulling the strands in order to elongate the strands, thereby reducing the strand diameter while increasing the strand length. In some instances, the stretching the strands may reduce the diameter by 50% or more and increase the length of the strands by 50% or more. In some instances, the material in the strands is bonded and less fluid at the time of stretching. This may reduce the likelihood that the strands will break during stretching and that allows the strands to be stretched suitably thin for pelletizing (e.g., the strands can be suitably thinned so that resulting pellets will closely resemble conventional pellets in size so that the resultant pellets can be used with standard molding equipment/processes).

In some instances, skinning the strands occurs prior to stretching the strands. In other instances, stretching occurs prior to skinning the strands. In still other instances, skinning and stretching the strands occurs substantially at the same time and/or during a single process.

The skinned and stretched strands may be cooled. Box 18 represents the cooled strands and/or the process of cooling the strands (e.g., cooling the stretched and skinned strands). Cooling may include disposing the strands in an oil (e.g., cool mineral oil) bath or mist, disposing the strands in a water (e.g., cool water) bath or mist, disposing the strands in a cooling chamber, and/or the like. In general, skinning and/or stretching the strands occurs prior to the cooling processes. This may help to reduce breakage of the strands.

Finally, the cooled strands may be cut/chopped into the desired size to form pellets. Box 20 represents the pellets and/or the process of cutting/chopping the cooled strands into pellets. The cutting process may break the strands into pellets of a desired size and/or shape. The pellets formed by the process disclosed herein may be used in the plastics industry to form new plastic articles using conventional plastic manufacturing equipment.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The invention's scope is, of course, defined in the language in which the appended claims are expressed.

What is claimed is:

1. A method for forming pellets from recycled plastic, the method comprising:
    disposing a mixed recycle plastic material into an extrusion apparatus, wherein the mixed recycle plastic material comprises a non-melt material;
    heating the mixed plastic material;
    advancing the mixed plastic material through a strand die to form a plurality of mixed plastic strands, the strand die having a plurality of non-restrictive openings formed therein that are configured to allow the mixed plastic material and the non-melt material to pass therethrough;
    forming a skin on the mixed plastic strands by misting mineral oil onto the extruded strands, the mineral oil vaporizing upon contact with the strands;
    stretching the mixed plastic strands; and
    cutting each of the mixed plastic strands into a plurality of mixed plastic pellets,
    wherein the method is employed without use of a screen or melt filter for the mixed recycle plastic material.

2. The method of claim 1, further comprising cooling the mixed plastic strands after forming a skin on the mixed plastic strands, after stretching the mixed plastic strands, or after both forming a skin on the mixed plastic strands and stretching the mixed plastic strands.

3. The method of claim 1, wherein the mixed plastic material comprises two or more different plastics.

4. The method of claim 1, wherein the mixed plastic material comprises three or more different plastics.

5. The method of claim 1, wherein the mixed plastic material comprises paper.

6. The method of claim 1, wherein the plurality of non-restrictive openings include openings that are about 0.15625 to 0.5 inches in diameter.

7. The method of claim 1, wherein the plurality of non-restrictive openings include openings that are about 0.1875 to 0.375 inches in diameter.

8. The method of claim 1, wherein the plurality of non-restrictive openings include openings that are about 0.25 inches in diameter.

9. The method of claim 1, wherein forming a skin on the mixed plastic strands forms a barrier that substantially prevents liquid from being absorbed into the mixed plastic strands.

10. The method of claim 1, wherein forming a skin on the mixed plastic strands forms a barrier that substantially vaporizes liquid contacting the mixed plastic strands due to heat retained by the strands from said extrusion apparatus.

11. A method for forming pellets from recycled plastic, the method comprising:
    disposing a mixed recycle plastic material into an extrusion apparatus;
    heating the mixed plastic material;
    advancing the mixed plastic material through an enlarged-hole strand die to form a plurality of mixed plastic strands, the strand die having a plurality of non-restrictive openings formed therein that are configured to allow the mixed plastic material to pass therethrough;
    forming a skin on the mixed plastic strands by misting mineral oil onto the extruded strands, the mineral oil vaporizing upon contact with the strands;
    stretching the mixed plastic strands; and
    cutting each of the mixed plastic strands into a plurality of mixed plastic pellets,
    wherein the method is employed without use of a screen or melt filter for the mixed recycle plastic material.

12. The method of claim 11, further comprising cooling the mixed plastic strands after forming a skin on the mixed plastic strands, after stretching the mixed plastic strands, or after both forming a skin on the mixed plastic strands and stretching the mixed plastic strands.

13. The method of claim 11, wherein the mixed plastic material comprises two or more different plastics.

14. The method of claim 11, wherein the mixed plastic material comprises three or more different plastics.

15. The method of claim 11, wherein the mixed plastic material comprises paper.

16. The method of claim 11, wherein the plurality of non-restrictive openings include openings that are about 0.15625 to 0.5 inches in diameter.

17. The method of claim 11, wherein the plurality of non-restrictive openings include openings that are about 0.1875 to 0.375 inches in diameter.

18. The method of claim 11, wherein the plurality of non-restrictive openings include openings that are about 0.25 inches in diameter.

19. The method of claim 11, wherein forming a skin on the mixed plastic strands forms a barrier that substantially prevents liquid from being absorbed into the mixed plastic strands.

20. The method of claim 11, wherein forming a skin on the mixed plastic strands forms a barrier that substantially vaporizes liquid contacting the mixed plastic strands due to heat retained by the strands from said extrusion apparatus.

* * * * *